US010045518B2

(12) United States Patent
Shen

(10) Patent No.: US 10,045,518 B2
(45) Date of Patent: Aug. 14, 2018

(54) FISHING REEL WITH SINGLE-HANDEDLY ASSEMBLED AND DISASSEMBLED ROCKER ARM ASSEMBLY

(71) Applicant: NINGBO ZHONGYUAN ALLJOY FISHING TACKLE CO., LTD., Zhejiang (CN)

(72) Inventor: Zhicheng Shen, Zhejiang (CN)

(73) Assignee: NINBO ZHONGYUAN ALLJOY FISHING TACKLE CO., LTD., Zhejiang (CN)

( * ) Notice: Subject to any disclaimer, the term of this patent is extended or adjusted under 35 U.S.C. 154(b) by 0 days.

(21) Appl. No.: 15/573,126

(22) PCT Filed: Jan. 26, 2016

(86) PCT No.: PCT/CN2016/072188
§ 371 (c)(1),
(2) Date: Nov. 9, 2017

(87) PCT Pub. No.: WO2016/184164
PCT Pub. Date: Nov. 24, 2016

(65) Prior Publication Data
US 2018/0103626 A1    Apr. 19, 2018

(30) Foreign Application Priority Data

May 18, 2015 (CN) .......................... 2015 1 0249325
May 18, 2015 (CN) ..................... 2015 2 0316715 U

(51) Int. Cl.
*A01K 89/01* (2006.01)
*A01K 89/00* (2006.01)
*A01K 89/015* (2006.01)

(52) U.S. Cl.
CPC .......... *A01K 89/006* (2013.01); *A01K 89/015* (2013.01)

(58) Field of Classification Search
CPC ..... A01K 89/00; A01K 89/004; A01K 89/006
See application file for complete search history.

(56) References Cited

U.S. PATENT DOCUMENTS 5,605,298 A * 2/1997 Shimozaki .......... A01K 89/006
242/231
6,502,775 B1 * 1/2003 Neufeld ............... A01K 89/006
242/282
(Continued)

FOREIGN PATENT DOCUMENTS

CN         2836467      11/2006
CN       200983798      12/2007
(Continued)

OTHER PUBLICATIONS

"International Search Report (Form PCT/ISA/210)", ddated Mar. 30, 2016, with English translation thereof, pp. 1-4.

Primary Examiner — Emmanuel M Marcelo
(74) Attorney, Agent, or Firm — JCIPRNET

(57) ABSTRACT

Disclosed is a fishing reel with a rocker arm assembly which can be assembled or disassembled single-handedly, comprising a fishing reel main body, a main body cover, a winding reel, a transmission device and a rotor. The transmission device comprises a gear plate and a rocker arm assembly, wherein the rocker arm assembly is inserted into a center shaft hole connecting the gear plate. The rocker arm assembly comprises a rocker arm hexagon core, a rocker arm sleeve, a rocker arm and a handle, wherein the rocker arm hexagon core is inserted into and connects the rocker arm sleeve, the rocker arm sleeve is connected to one end of the rocker arm, and the other end of the rocker arm is movably connected to the handle. The fishing reel thus has a rocker arm assembly which is flexibly combined, and can be assembled and disassembled single-handedly.

3 Claims, 5 Drawing Sheets

(56) References Cited

U.S. PATENT DOCUMENTS

| | | | | |
|---|---|---|---|---|
| 6,626,385 B1* | 9/2003 | Tsutsumi | ............ | A01K 89/006 |
| | | | | 242/282 |
| 2014/0084096 A1* | 3/2014 | Inoue | ............ | F16H 55/08 |
| | | | | 242/249 |
| 2014/0084097 A1* | 3/2014 | Taylor | ............ | A01K 89/0105 |
| | | | | 242/255 |
| 2014/0291430 A1* | 10/2014 | Takamatsu | ............ | A01K 89/006 |
| | | | | 242/283 |

FOREIGN PATENT DOCUMENTS

| | | | | |
|---|---|---|---|---|
| CN | 202285931 | | 7/2012 | |
| CN | 104904687 | | 9/2015 | |
| CN | 204634803 | | 9/2015 | |
| EP | 2689661 A1 * | | 1/2014 | ............ A01K 89/01 |
| JP | 5495669 | | 5/2014 | |

* cited by examiner

FISHING REEL WITH SINGLE-HANDEDLY ASSEMBLED AND DISASSEMBLED ROCKER ARM ASSEMBLY

CROSS-REFERENCE TO RELATED APPLICATION

This application is a 371 application of an international PCT application serial no. PCT/CN2016/072188, filed on Jan. 26, 2016, which claims the priority benefit of China application no. 201510249325.8, filed on May 18, 2015, and China application no. 201520316715.8, filed on May 18, 2015. The entirety of each of the above-mentioned patent applications is hereby incorporated by reference herein and made a part of this specification.

TECHNICAL FIELD

The present invention relates to a fishing reel, specifically to a fishing reel with a flexibly combined and one-handed removable rocker arm assembly.

DESCRIPTION OF RELATED ART

The existing fishing reel comprises a fishing reel main body, a winding reel, a transmission device and a rotor. The fishing reel main body comprises a fishing rod mounting base, a frame body and a cover body. The frame body has a placement space for rotational structure used to install a rotor. The cover body is used to cover the placement space of said frame body. The winding reel is installed on the fishing reel main body in a manner where it moves backward and forward relative to the fishing reel main body. The rotor is installed on the fishing reel main body in a rotatable manner and used to wind the fishing line on the winding reel. In the case of fishing, when a bait is changed or a fish bites the hook to take a fishhook assembly, the common practice is that the handle installed on the fishing reel main body is rotated to drive the rocker arm to rotate so as to make the driving force produced by said rocker arm hexagon core drive a sliding block and a winding reel spindle through said transmission device so that the winding reel moves backward and forward relative to the fishing reel main body, and the rotor winds the fishing line on the winding reel in a rotatable manner and takes back the hook assembly. In the prior art, the rocker arm hexagon core pass through the frame body and the cover body, and its middle part is inserted into the central axle hole of said gear plate and then locked with a nut at the other side at the insertion side to fasten the whole rocker arm assembly on the fishing reel. As a result, the rocker arm assembly needs to be assembled or disassembled with two hands and its assembling or disassembling cannot be done with one hand, and the design of fishing reel is restricted and cannot do without nuts at the opposite side. Therefore, there is still room for improvement with respect to the fishing reel in the prior art.

SUMMARY OF THE INVENTION

To solve the above-mentioned defects, the present invention is intended to provide a fishing reel with a flexibly combined and one-handed removable rocker arm assembly.

To achieve the above purpose, the invention adopts the following technical solution:

A fishing reel with single-handedly assembled and disassembled rocker arm assembly, comprising a fishing reel main body, a main body cover, a winding reel, a transmission device and a rotor, wherein said transmission device comprises a gear plate and a rocker arm assembly, which is inserted into a central axle hole of said gear plate; said rocker arm assembly comprises a rocker arm hexagon core, a rocker arm sleeve, a rocker arm and a handle; said rocker arm hexagon core is inserted into said rocker arm sleeve, which is connected with one end of said rocker arm, and the other end of said rocker arm is flexibly connected with said handle; characterized in that said rocker arm assembly also includes a control lever, at least two stop blocks, a ring spring and a tightening knob, wherein:

The axis of said rocker arm hexagon core is provided with a hexagonal through-hole, which is concentric with the axis through-hole of said rocker arm sleeve; one end of said rocker arm hexagon core is tapped with internal thread, and the external surface of such end as tapped with internal thread is provided with a circular groove, which is provided with at least two equally distributed locking through-holes; said ring spring is connected with said circular groove; at least two stop blocks are connected with at least two locking through-holes; said ring spring is connected with at least two stop blocks;

Said control lever is inserted into a hexagonal through-hole of said rocker arm hexagon core, and the external surface of one inserted end of said control lever is tapped with stop threads, one end of which is connected with a circular arc stop block; one end of said control lever keeping away from said stop threads is provided with an adjusting column, which is connected with said tightening knob;

Said rocker arm hexagon core is inserted into a central axle hole of said gear plate, and the place at which the inner wall of the central axle hole of said gear plate corresponds to at least two stop blocks is provided with a circular axle hole groove.

According to the fishing reel as set forth in a preferred embodiment of this invention, said rocker arm assembly also includes a rocker arm cover and a compression spring; said rocker arm cover is connected with said rocker arm; the place of said rocker arm cover that covers said rocker arm sleeve is provided with a three-way hole, which is connected with said tightening knob and in which said compression spring is placed; one end of said compression spring is connected with said tightening knob, and the other end of said compression spring is connected with said rocker arm cover.

According to the fishing reel as set forth in a preferred embodiment of this invention, said fishing reel also includes a bushing sleeve, which is connected with said rocker arm sleeve as well as with said rocker arm and said rocker arm cover by using screws.

In the present invention, the rocker arm assembly can be assembled with one hand, dispensing with connecting nuts. So, its assembling is more convenient and its modeling is easier.

Since the above technical features are adopted, the invention has the following advantages and positive effects compared with the existing technology:

(1) The present invention is designed with a control rod, a ring spring and a stop block and the rocker arm assembly can be assembled or disassembled only by rotating a tightening knob, so the invention has the advantages of simple parts and flexible combination.

(2) The invention dispenses with connecting nuts, and its appearance design is more flexible and its products are more diversified, so the enterprise costs are reduced.

Of course, any specific embodiment of this invention does not necessarily have all of the above technical effects.

DETAILED DESCRIPTION OF THE INVENTION

According to the figures herein, below is the description of some preferred embodiments of this invention in a detailed way, but this invention is not limited to these embodiments. The invention covers any replacements, modifications, equivalent methods and proposals made to the essence and scope of the invention. In order to make it easier for the public to thoroughly understand the present invention, specific details are described in a preferred embodiment of this invention below, while the technicians in this field can fully understand the invention without such description. In addition, in order to prevent unnecessary confusion to the essence of the invention, well-known methods, processes, work flows and elements, etc. are not described in detail.

Figure 1:
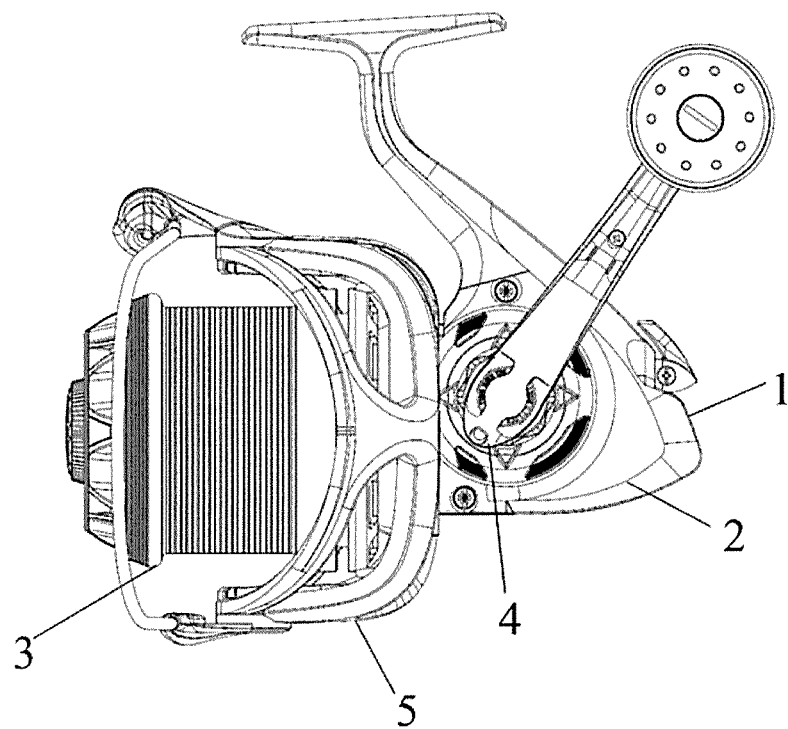
FIG. 1 is a schematic diagram for fishing reel.
Figure 2:
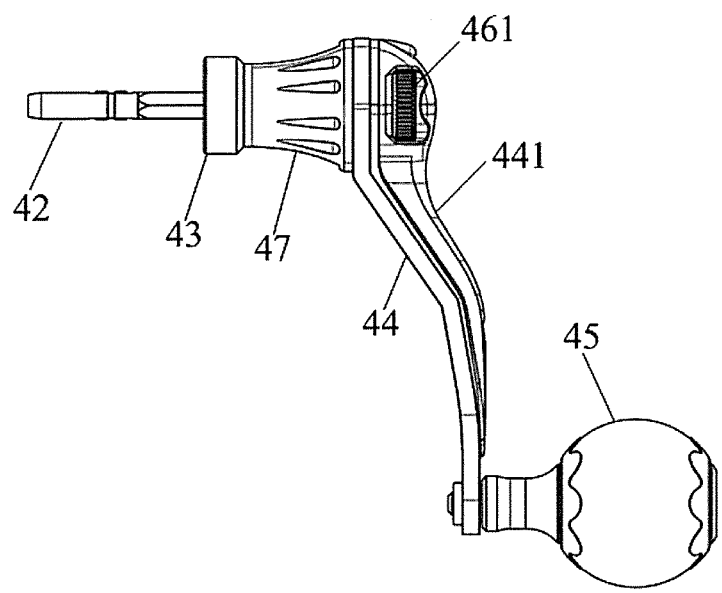
FIG. 2 is a schematic diagram for rocker arm assembly.
Figure 3:
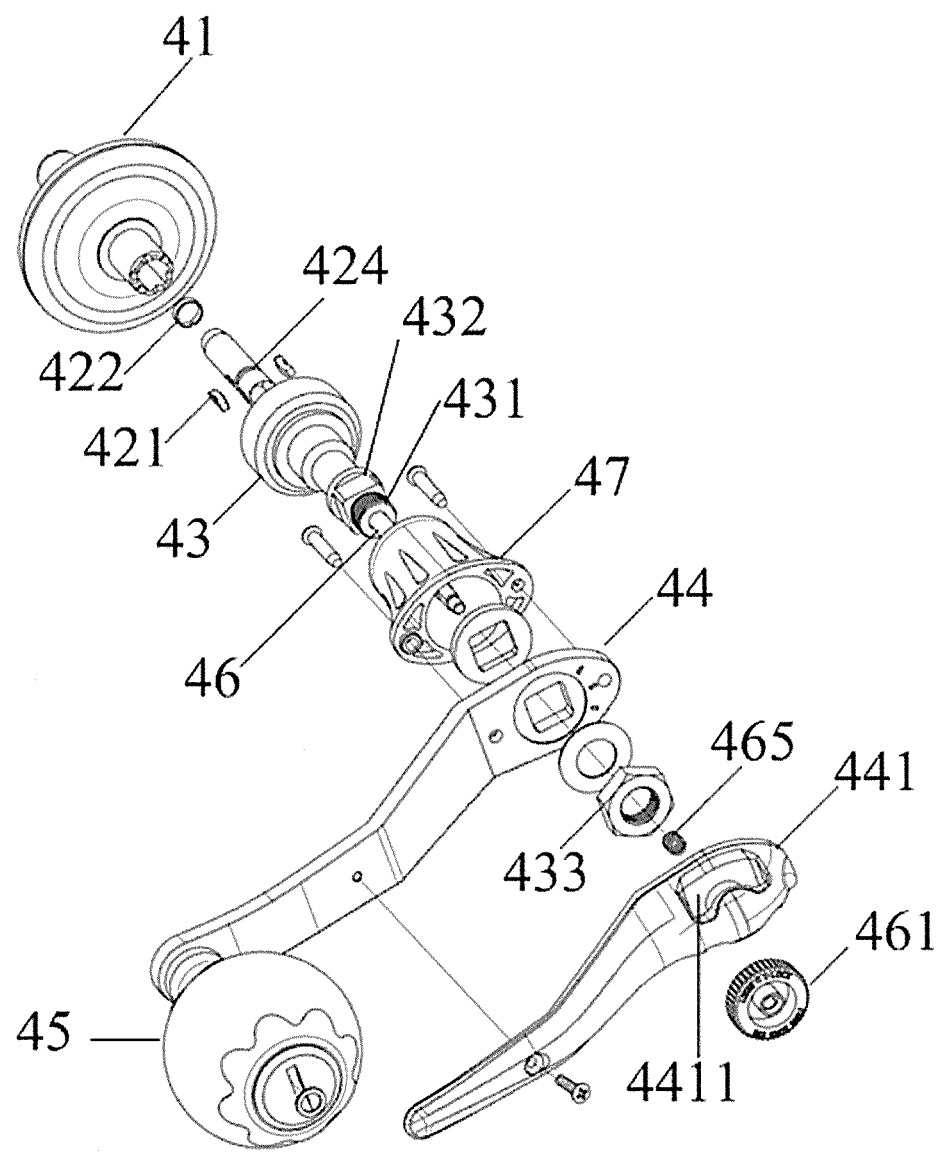
FIG. 3 is a schematic diagram for decomposition of rocker arm assembly.
Figure 4:
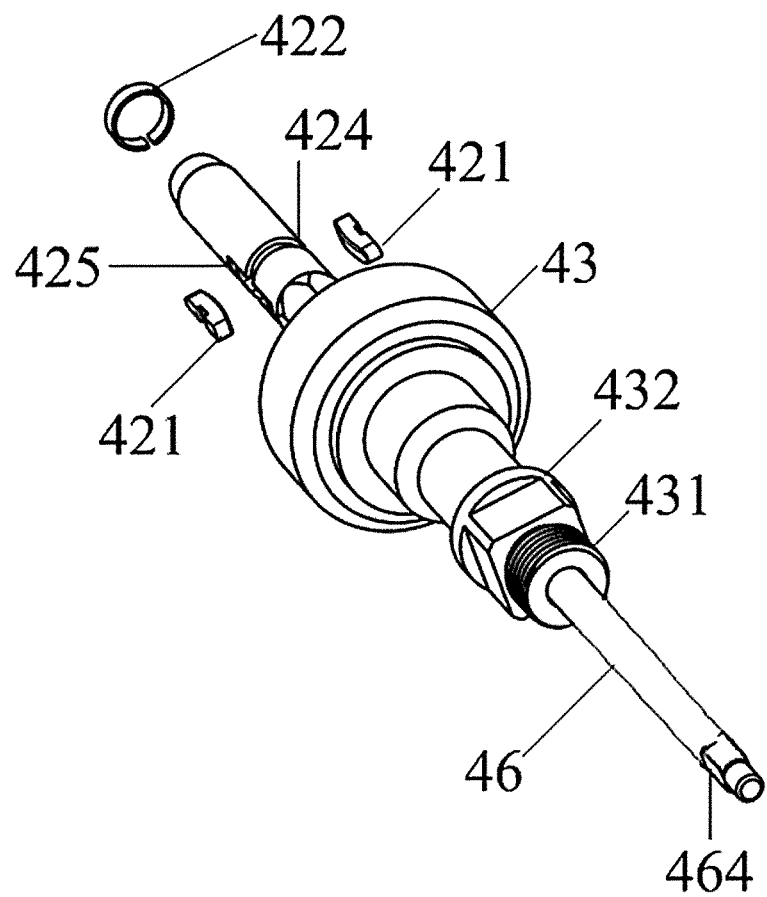
FIG. 4 is a schematic diagram for some parts.

As shown in FIGS. 1-4, a fishing reel with single-handedly assembled and disassembled rocker arm assembly comprises a fishing reel main body 1, a main body cover 2, a winding reel 3, a transmission device 4 and a rotor 5. The transmission device 4 comprises a gear plate 41 and a rocker arm assembly, which is inserted into a central axle hole of said gear plate 41. Said rocker arm assembly comprises a rocker arm hexagon core 42, a rocker arm sleeve 43, a rocker arm 44 and a handle 45, wherein said rocker arm hexagon core 42 is inserted into said rocker arm sleeve 43, which is connected with one end of said rocker arm 44, and the other end of said rocker arm 44 is flexibly connected with said handle 45.

In addition, said rocker arm assembly also includes a control lever 46, at least two stop blocks 421, a ring spring 422 and a tightening knob 461, which is used to assemble or disassemble a gear plate 41 and a rocker arm assembly, wherein: the axis of said rocker arm hexagon core 42 is provided with a hexagonal through-hole 426, which is concentric with the axis through-hole of said rocker arm sleeve 43; one end of said rocker arm hexagon core 42 is tapped with an internal thread 423, and the external surface of such end as tapped with an internal thread 423 is provided with a circular groove 424, which is provided with at least two equally distributed stop through-holes 425; said ring spring 422 is a notched annular spring and connected with said circular groove 424. At least two stop blocks 421 are connected with at least two locking through-holes 425; said ring spring 422 is connected with at least two stop blocks 421; in this embodiment, there are 2 stop blocks and 2 locking through-holes, which are required to be equally distributed, however, this arrangement is not intended to limit the invention, as long as the stop blocks and the locking through-holes are evenly distributed on the circular groove, for example, three stop blocks and three locking through-holes are distributed at an angle of 120 degree, or four stop blocks and four locking through-holes are distributed at an angle of 90 degrees. Said stop blocks 421 are blocks, and one side of said stop block facing toward the axis of said rocker arm hexagon core 42 is a protruding arc.

The axis of said rocker arm sleeve 43 is provided with an axis through-hole, two ends of which are different; one end of said axis through-hole connecting with said rocker arm hexagon core 42 is hexagonal so that said rocker arm hexagon core 42 is inserted to match with said axis through-sole to rotate, and the other end of said axis through-hole is round and used to insert said control lever 46; in addition, one end of said rocker arm sleeve 43 inserted at said control lever 46 is tapped with an arm bonded thread 431 and provided with an arm bonded step 432, and said arm bonded thread 431 is locked with a nut 433 after inserted into the rocker arm through-hole on said rocker arm 44 so that said rocker arm sleeve 43 is permanently connected with said rocker arm 44.

Figure 5:
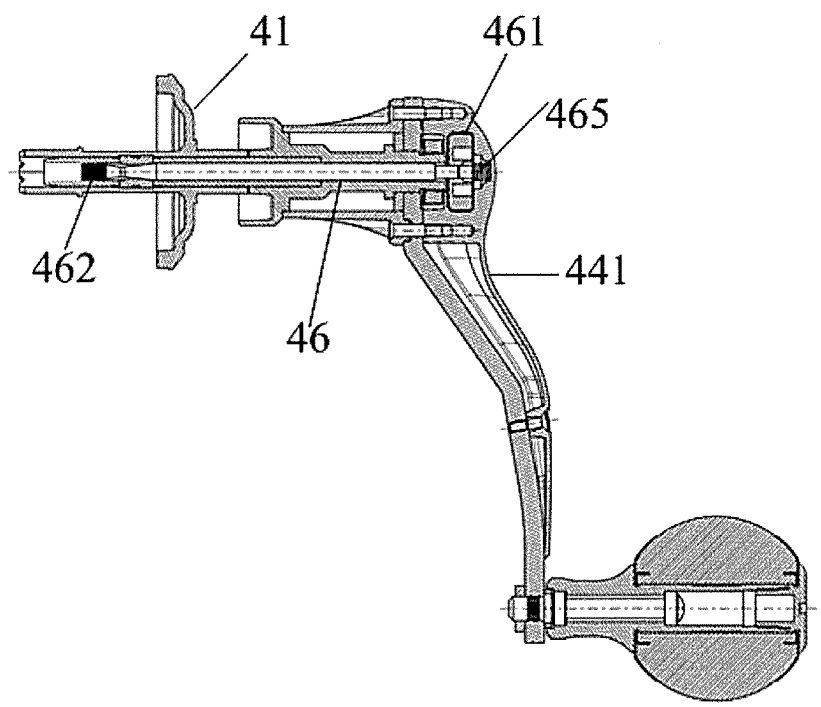
FIG. 5 is a schematic diagram for rocker arm assembly in a non-removable state.
Figure 6:
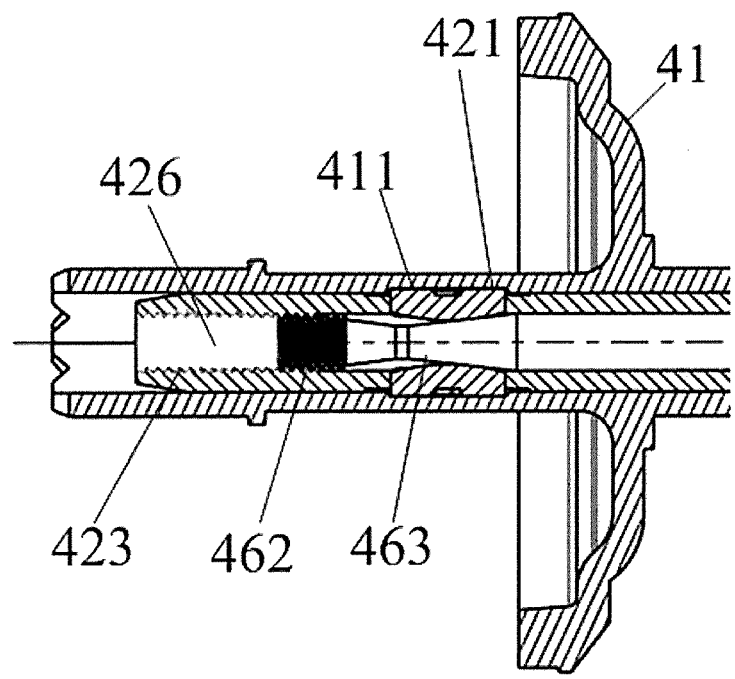
FIG. 6 is a partially enlarged drawing of FIG. 5.
Figure 7:
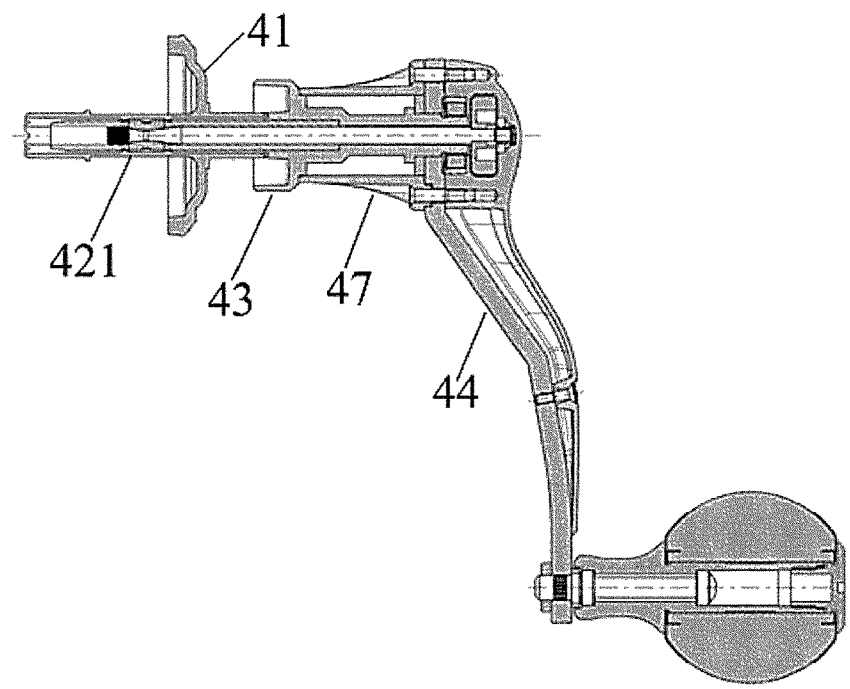
FIG. 7 is a schematic diagram for rocker arm assembly in a removable state.
Figure 8:
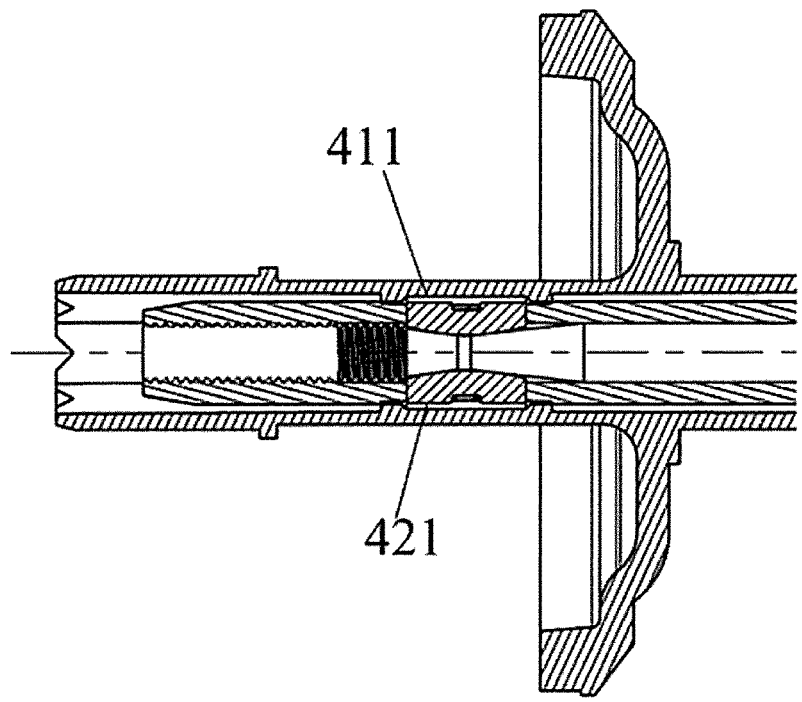
FIG. 8 is a partially enlarged drawing of FIG. 7.

Said control lever 46 is inserted into a hexagonal through-hole 426 of said rocker arm hexagon core 42, and the external surface of one inserted end of said control lever 46 is tapped with a stop thread 462, one end of which is connected with a circular arc stop block 463; one end of said control lever 46 keeping away from said stop thread 462 is provided with an adjusting column 464, which is connected with said tightening knob 461. The shape of said adjusting column 464 can be square or it can be round taking out one arc or two arcs corresponding to the circle center. In other words, there are at least one plane and one platform which can be connected with said tightening knob 461 in order to facilitate rotation and pressure application. Said rocker arm hexagon core 42 is inserted into a central axle hole of said gear plate 41, and the place at which the inner wall of the central axle hole of said gear plate 41 corresponds to stop blocks 421 is provided with a circular axle hole groove 411. As shown in FIGS. 5-8, in a removable state of said rocker arm assembly, said ring spring 422 covers a stop block 421 at a circular arc stop block 463, and at this point, said stop block 421 is completely set into the outer edge of said rocker arm hexagon core 42; when said tightening knob 461 is rotated to make said control lever 46 face toward the internal thread 423 of said rocker arm hexagon core 42, the slope of said circular arc stop block 463 pushes said stop block 421 outwards, and said stop block 421 protrudes from the outer edge of said rocker arm hexagon core 42 and enters the circular axle hole groove 411 of said gear plate 41 so that the rocker arm assembly is in a non-removable state.

In addition, said rocker arm assembly also includes a rocker arm cover 441 and a compression spring 465, wherein: said rocker arm cover 441 is connected with said rocker arm 44 and locked with screw; the place of said rocker arm cover 441 that covers said rocker arm sleeve 43 is provided with a three-way hole 4411; said tightening knob 461 is placed in said three-way hole 4411 and can be manually rotated, and the diameter of said tightening knob 461 is greater than that of the hole of said three-way hole 4411 facing toward said rocker arm hexagon core 42, so said tightening knob 461 is confined in said three-way hole 4411 when rotated; said compression spring 465 is placed in said three-way hole 4411, and one end of said compression spring 465 is connected with said tightening knob 461 and the other end of said compression spring 465 is connected with said rocker arm cover 441. The role of said compression spring 465 is to press said control lever 46 into the internal thread 423 of rocker arm hexagon core 42 by means of pressing said tightening knob 461 so that the stop thread 462 and internal thread 423 of said control lever 46 can press against each other even if said rocker arm assembly is in a removable state. So, when said tightening knob 461 is rotated, the stop thread 462 can be engaged with the internal thread 423 without down pressing force.

The rocker arm assembly also includes a bushing sleeve 47, which is connected with said rocker arm sleeve 43 as well as with said rocker arm 44 and said rocker arm cover 441 by using screws. Said bushing sleeve 47 and said rocker arm cover 441 provide a protective effect as well as a beautiful effect. Different bushing sleeves 47 and rocker arm covers are designed to form different ornamental effects and diversify products. Certainly, said rocker arm cover 441 can be provided with a block of three-way hole only and does not need to cover almost the whole rocker arm 44. In this case, its visual effect is distinctive.

The operating principle of this invention is described as follows: In assembling the rocker arm assembly, a controller lever 46 is inserted into a hexagonal through-hole 426 of said rocker arm hexagon core 42 and a tightening knob 461 is rotated to face toward the locking direction; under the action of said compression spring 465, the stop thread 462 of said control lever 46 always contacts with the internal thread 423 of said rocker arm hexagon core 42 and the tightening knob 461 is confined in the three-way hole 4411 of said rocker arm cover 441, so as long as the tightening knob 461 is rotated, the stop thread 462 and the internal thread 423 begin to engage with each other and the control lever 46 gradually moves forward in the direction of said internal thread 423, and at this point the circular arc stop block 463 of said control lever 46 pushes said stop block 421 to move radially and enter the circular axle hole groove 411 at the central axle hole of said gear plate 41; in turn, when the rocker arm assembly is disassembled, the tightening knob 461 is rotated to face toward the loosening direction, the control lever 46 gradually leaves the internal thread 423 and the pushing force applied to said circular arc stop block 463 decreases, and under the action of said ring spring 422, the stop block gradually returns into the outer edge of said rocker arm hexagon core 42, and at this moment the rocker arm assembly can be disassembled. Since the one-handed removable rocker arm assembly dispenses with connecting nuts, the junction surface can be provided with different designs, for example, with overall arc modeling or decorative sheet, instead of assembling a nut thereupon. In this case, the fishing reels can be diversified.

To sum up, since the above technical features are adopted, the invention has the following advantages and positive effects compared with the existing technology:

(1) The present invention is designed with a control lever, a ring spring and a stop block and the rocker arm assembly can be assembled or disassembled only by rotating a tightening knob, so the invention has the advantages of simple parts and flexible combination.

(2) The invention dispenses with connecting nuts, and its appearance design is more flexible and its products are more diversified, so the enterprise costs are reduced.

The preferred embodiment is for setting forth the invention only. The preferred embodiment does not specifically describe all details, and this invention is not limited to the stated specific embodiment. Obviously, the embodiment can be modified and changed a lot as per the contents of the invention. This specification selects and specifically describes these embodiments with a view to better explaining the principle and actual application of the present invention, thus enabling technicians in this technical field to understand and utilize the invention in a better way. The invention is only restricted by the claims as well as all of its coverage and equivalents. What disclosed above are only the preferred embodiments of the invention; however, they are not used for restricting the invention. Equivalent changes and alterations made by any technician familiar with this field shall fall into the scope of protection of this invention without going against the spiritual connotation of the invention.

What is claimed is:

1. A fishing reel with single-handedly assembled and disassembled rocker arm assembly, comprising a fishing reel main body, a main body cover, a winding reel, a transmission device and a rotor, wherein said transmission device comprises a gear plate and a rocker arm assembly, wherein said rocker arm assembly is inserted into a central axle hole of said gear plate; said rocker arm assembly comprises a rocker arm hexagon core, a rocker arm sleeve, a rocker arm and a handle; said rocker arm hexagon core is inserted into said rocker arm sleeve, wherein said rocker arm sleeve is connected with one end of said rocker arm, and the other end of said rocker arm is flexibly connected with said handle, wherein said rocker arm assembly also includes a control lever, at least two stop blocks, a ring spring and a tightening knob, wherein an axis of said rocker arm hexagon core is provided with a hexagonal through-hole, wherein said hexagonal through-hole is concentric with an axis through-hole of said rocker arm sleeve; one end of said rocker arm hexagon core is tapped with an internal thread, and an external surface of such end as tapped with the internal thread is provided with a circular groove, wherein said circular groove is provided with at least two equally distributed locking through-holes; said ring spring is connected with said circular groove; said at least two stop blocks are connected with said at least two locking through-holes; said ring spring is connected with said at least two stop blocks;

said control lever is inserted into the hexagonal through-hole of said rocker arm hexagon core, and an external surface of one inserted end of said control lever is tapped with a stop thread, wherein one end of said stop thread is connected with a circular arc stop block; one end of said control lever keeping away from said stop thread is provided with an adjusting column, wherein said adjusting column is connected with said tightening knob;

and said rocker arm hexagon core is inserted into the central axle hole of said gear plate, and a place at which an inner wall of the central axle hole of said gear plate corresponds to said at least two stop blocks is provided with a circular axle hole groove.

2. The fishing reel as set forth in claim 1, wherein said rocker arm assembly also includes a rocker arm cover and a compression spring; said rocker arm cover is connected with said rocker arm; a place of said rocker arm cover that covers said rocker arm sleeve is provided with a three-way hole, wherein said three-way hole is connected with said tightening knob and said compression spring is placed in said three-way hole; and one end of said compression spring is connected with said tightening knob, and the other end of said compression spring is connected with said rocker arm cover.

3. The fishing reel as set forth in claim 1, wherein said rocker arm assembly also includes a bushing sleeve, which is connected with said rocker arm sleeve as well as with said rocker arm and said rocker arm cover by using screws.

* * * * *